(12) United States Patent
Mitsuno et al.

(10) Patent No.: US 12,449,587 B2
(45) Date of Patent: Oct. 21, 2025

(54) PLASTIC OPTICAL FIBER, MEDICAL LIGHTING DEVICE, MEDICAL SENSOR DEVICE, MEDICAL PHOTOTHERAPY DEVICE, AND PLASTIC OPTICAL FIBER CORD

(71) Applicant: Toray Industries, Inc., Tokyo (JP)

(72) Inventors: Koki Mitsuno, Nagoya (JP); Satoshi Matsuba, Nagoya (JP); Kenji Hiramoto, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 281 days.

(21) Appl. No.: 18/087,788

(22) PCT Filed: Jun. 21, 2021

(86) PCT No.: PCT/JP2021/023342
§ 371 (c)(1),
(2) Date: Dec. 22, 2022

(87) PCT Pub. No.: WO2022/009653
PCT Pub. Date: Jan. 13, 2022

(65) Prior Publication Data
US 2024/0255693 A1  Aug. 1, 2024

(30) Foreign Application Priority Data

Jul. 9, 2020 (JP) .................................. 2020-118201
Oct. 15, 2020 (JP) .................................. 2020-173750

(51) Int. Cl.
| G02B 6/02 | (2006.01) |
| C08L 33/08 | (2006.01) |
| G02B 6/036 | (2006.01) |
| A61B 1/00 | (2006.01) |
| A61B 1/07 | (2006.01) |

(52) U.S. Cl.
CPC .......... *G02B 6/02033* (2013.01); *C08L 33/08* (2013.01); *G02B 6/03622* (2013.01); *G02B 6/03633* (2013.01); *A61B 1/0017* (2013.01); *A61B 1/07* (2013.01)

(58) Field of Classification Search
CPC ............ G02B 6/02033; G02B 6/03622; G02B 6/03633; G02B 6/046; G02B 6/048; A61B 1/0017; A61B 1/07; C08L 38/08; C08L 25/06; C08L 27/00
See application file for complete search history.

(56) References Cited

U.S. PATENT DOCUMENTS

| 4,568,146 A * | 2/1986 | Ueba ........................ D01F 8/04 |
| | | 428/394 |
| 4,828,359 A * | 5/1989 | Ueba ................. G02B 6/02033 |
| | | 264/1.29 |
| 8,600,210 B2 | 12/2013 | Yoshida et al. |
| 10,295,719 B2 | 5/2019 | Rose et al. |
| 11,287,566 B2 * | 3/2022 | Matsuba ............... C09D 127/18 |
| 11,454,756 B2 * | 9/2022 | Kojima .............. G02B 6/02033 |
| 2008/0205840 A1 * | 8/2008 | Wakabayashi ........... G02B 6/08 |
| | | 264/1.24 |
| 2009/0279837 A1 | 11/2009 | Aoyagi et al. |
| 2012/0020637 A1 * | 1/2012 | Maeda ................... C08F 214/26 |
| | | 385/145 |
| 2012/0027369 A1 * | 2/2012 | Yoshida ................... C08F 12/18 |
| | | 385/123 |
| 2012/0177329 A1 * | 7/2012 | Sakabe .............. G02B 6/02033 |
| | | 385/100 |
| 2014/0107496 A1 * | 4/2014 | Hellstrom ............. A61B 5/0086 |
| | | 600/478 |
| 2017/0322372 A1 | 11/2017 | Kihara et al. |
| 2020/0003932 A1 | 1/2020 | Kihara et al. |
| 2020/0408987 A1 * | 12/2020 | Morinaka ............... C03C 25/50 |

FOREIGN PATENT DOCUMENTS

| CN | 107076922 A | 8/2017 |
| CN | 110431459 A | 11/2019 |
| EP | 0 229 202 A1 | 7/1987 |
| JP | S53-101442 A | 9/1978 |
| JP | S59-74502 A | 4/1984 |
| JP | S60-2903 A | 1/1985 |

(Continued)

OTHER PUBLICATIONS

Machine translation into English of JP-2003139972-A, 19 pages. (Year: 2003).*
Machine translation into English of JP-2004252356-A, 19 pages. (Year: 2004).*
International Search Report dated Sep. 7, 2021, of corresponding International Application No. PCT/JP2021/023342, along with an English translation.
Notice of Reasons for Refusal dated Oct. 31, 2024, from counterpart Japanese Patent Application No. 2021-539110.

(Continued)

*Primary Examiner* — Daniel Petkovsek
(74) *Attorney, Agent, or Firm* — DLA Piper LLP (US)

(57) ABSTRACT

A plastic optical fiber that has a multilayer structure that includes a core (X), a first cladding (Y), and a second cladding (Z), wherein the core is made of an organic polymer material having a water-absorbing ratio of not less than 0.001% and not more than 0.29% and a total light transmittance of not less than 80% and containing not less than 0.01% by weight and not more than 10% by weight of a plasticizer; a relationship between a refractive index of the core (X) and the refractive index of the first cladding (Y) is defined by inequality: X−Y>0.01, and a relationship between a refractive index of the first cladding (Y) and the refractive index of a second cladding (Z) is defined by inequality: Y−Z>0.05, wherein the plastic optical fiber has high humidity resistance and excellent bending resistance.

13 Claims, No Drawings

(56) References Cited

FOREIGN PATENT DOCUMENTS

| | | | |
|---|---|---|---|
| JP | S61-223806 | A | 10/1986 |
| JP | H01-229069 | A | 9/1989 |
| JP | H04-66907 | A | 3/1992 |
| JP | 2003139972 | A * | 5/2003 |
| JP | 2004-241237 | A | 8/2004 |
| JP | 2004252356 | A * | 9/2004 |
| JP | 2005-316358 | A | 11/2005 |
| JP | 2011-053638 | A | 3/2011 |
| JP | 2020-072969 | A | 5/2020 |

OTHER PUBLICATIONS

Notice of Reasons for Refusal dated Mar. 25, 2025, from counterpart Japanese Patent Application No. 2021-539110.
First Office Action dated Jun. 26, 2025, from counterpart Chinese Application No. 202180044367.1.
Extended European Search Report, from counterpart European Application No. 21838478.2.

* cited by examiner

PLASTIC OPTICAL FIBER, MEDICAL LIGHTING DEVICE, MEDICAL SENSOR DEVICE, MEDICAL PHOTOTHERAPY DEVICE, AND PLASTIC OPTICAL FIBER CORD

TECHNICAL FIELD

This disclosure relates to a plastic optical fiber and to a medical lighting device, a medical sensor device, a medical phototherapy device, and a plastic optical fiber cord, in all of which the plastic optical fiber is used.

BACKGROUND

Plastic optical fibers are better than glass optical fibers in terms of processability, handling properties, and production cost and are therefore used, for example, for short-length light signal transmission or in light guide applications.

A plastic optical fiber is normally composed of two layers: core and cladding. For the core, a polymer characterized by high transparency and excellent weather resistance, as represented by polymethyl methacrylate (PMMA), is generally used. On the other hand, for the cladding, a fluorine-containing polymer is widely used because the cladding is required to have a lower refractive index than the core to confine light within the core. However, since PMMA has high moisture-absorbing capacity, reduced light transmittance in a visible-light wavelength range around 800 nm due to moisture absorption has been a problem associated with plastic optical fibers using PMMA for the core.

An optical fiber that has been proposed as a plastic optical fiber having a core with low moisture-absorbing capacity is a plastic optical fiber having a core and a sheath both made of synthetic polymers, wherein a copolymer of fluoro-substituted deuterated styrene and deuterated (meth)acrylate forms the core (see, for example, JP S61-223806 A). However, since polystyrene is brittle and low in elongation, poor bending resistance has been a problem associated with plastic optical fibers using polystyrene for the core.

Thus, a plastic optical fiber having a structure consisting of a core, a sheath, and a protective layer, which are all made of plastics and in which a polymer with an elongation at break of not less than 30% is used as a material for the protective layer, has been proposed as a plastic optical fiber with excellent bending resistance (see, for example, JP H04-66907 A).

In particular, plastic optical fibers used in medical applications for endoscopic illumination require flexibility and durability against repeated bending to allow the plastic optical fibers to pass through complex-shaped organs in the body. In addition, plastic optical fibers used in light-guide sensors for robots and in photoelectric sensors for industrial machines also need high flexibility because each of the sensors has a large bendable portion. Moreover, plastic optical fibers used in environments where the plastic optical fibers may have contact with water, such as those in the body or in the outdoors, also need humidity resistance.

Even if the structure described in JP H04-66907 A is applied to a plastic optical fiber using polystyrene for the core, the bending resistance achieved is still below the high level of bending resistance required in recent years, and this problem has not been solved.

It could therefore be helpful to provide a plastic optical fiber with high humidity resistance and excellent bending resistance.

SUMMARY

We thus provide: A plastic optical fiber is configured as follows: the plastic optical fiber has a multilayer structure that includes a core, a first cladding, and a second cladding, wherein the core is made of an organic polymer material having a water-absorbing ratio of not less than 0.001% and not more than 0.29% and a total light transmittance of not less than 80% and containing not less than 0.01% by weight and not more than 10% by weight of a plasticizer, the relationship between the refractive index of the core (X) and the refractive index of the first cladding (Y) is defined by the inequality: X−Y>0.01, and the relationship between the refractive index of the first cladding (Y) and the refractive index of the second cladding (Z) is defined by the inequality:

$$Y - Z > 0.05.$$

A medical lighting device is configured as follows: the medical lighting device includes the above plastic optical fiber.

A medical sensor device is configured as follows: the medical sensor device includes the above plastic optical fiber.

A medical phototherapy device is configured as follows: the medical phototherapy device includes the above plastic optical fiber.

A plastic optical fiber cord is configured as follows: the plastic optical fiber cord comprises at least one coating layer in an outer layer over the plastic optical fiber.

Preferably, the plastic optical fiber satisfies inequalities (1) and (2):

$$0.01 \leq x \leq 20, \quad (1)$$

wherein x is represented by: (thickness of the first cladding)×100/(diameter of the fiber) (%); and $$0.5 \leq y, \quad (2)$$

wherein y is represented by: (thickness of the second cladding)×100/(diameter of the fiber) (%).

Preferably, the core in the plastic optical fiber is made of a polymer mainly composed of any of styrene, cycloolefin, methyl pentene, and carbonate.

Preferably, the first cladding in the plastic optical fiber is made of a polymer of methyl methacrylate and/or of a copolymer mainly composed of methyl methacrylate and containing not less than 0.1% by weight and not more than 12% by weight of at least one copolymerization component, selected from the group consisting of methyl acrylate, ethyl acrylate, and butyl acrylate.

Preferably, the second cladding in the plastic optical fiber has a water-absorbing ratio of not less than 0.001% and not more than 0.29% and an elastic modulus of not less than 100 MPa and not more than 2000 MPa.

Preferably, the second cladding in the plastic optical fiber contains not less than 0.03% by weight and not more than 5.0% by weight of carbon black.

Preferably, the value R (dB/km) of optical transmission loss measured at a wavelength of 660 nm and the value I (dB/km) of optical transmission loss measured at a wavelength of 800 nm for the plastic optical fiber satisfy the inequality: R<I.

Preferably, the value R (dB/km) of optical transmission loss measured at a wavelength of 660 nm and the value I (dB/km) of optical transmission loss measured at a wavelength of 800 nm for the plastic optical fiber satisfy the inequality: 0.2<R/I<1.

Preferably, the core in the plastic optical fiber has a melt mass flow rate of not less than 1 g/10 min and not more than 200 g/10 min (at a temperature of 230° C. under a load of 3.8 kg).

Preferably, the plastic optical fiber has a fiber diameter of not less than 100 μm and not more than 500 μm.

We thus provide a plastic optical fiber with high humidity resistance and excellent bending resistance.

DETAILED DESCRIPTION

Preferred examples of a plastic optical fiber and a plastic optical fiber cord including the plastic optical fiber will be specifically described below. However, this disclosure will not be limited to the following examples, and various alterations according to different purposes and applications may be employed.

The plastic optical fiber includes a core, a first cladding, and a second cladding, which are arranged in this order. The plastic optical fiber may have three or more cladding layers: in this example, the first cladding is the innermost cladding adjacent to the core, and the second cladding is a cladding that is positioned on the outside of and adjacent to the first cladding.

Core

In the plastic optical fiber, the core is preferably made of a polymer that is mainly composed of the following: styrene, cycloolefin, methyl pentene, and carbonate, and more preferably made of a polymer that is mainly composed of styrene residues. Stable light transmission is provided by using any of the preferred polymers for the core. Examples of the polymerization components (monomers) of such polymers include styrene, substituted styrenes, such as methylstyrene or α-methylstyrene, (meth)acrylic esters, (meth)acrylic acid, and N-substituted maleimides. The term (meth)acrylic ester refers to both acrylate and methacrylate, and examples of (meth)acrylic esters include methyl acrylate, ethyl methacrylate, butyl methacrylate, t-butyl methacrylate, cyclohexyl methacrylate, benzyl methacrylate, phenyl methacrylate, bornyl methacrylate, and adamantyl methacrylate. Examples of N-substituted maleimides include N-(isopropyl)maleimide, N-(cyclohexyl)maleimide, N-(methyl)maleimide, N-(ethyl)maleimide, and N-(o-methylphenyl) maleimide. Any two of the components may be used. A polymer that is mainly composed of styrene residues refers to a polymer in which not less than 50% by mole of the repeating units that make up the polymer are derived from styrene. Preferably, the content of styrene residues in the repeating units that make up the polymer is not less than 70% by mole, more preferably not less than 90% by mole. A polymer that is mainly composed of styrene residues can be selected to increase the humidity resistance.

In the plastic optical fiber, the core contains not less than 0.01% by weight and not more than 10% by weight of a plasticizer. The presence of a plasticizer allows the core to have excellent formability and high flexibility and to attain higher bending resistance. When the content of the plasticizer in the core is less than 0.01% by weight, the core has poor formability and low flexibility. On the other hand, when the content of the plasticizer in the core is more than 10% by weight, the core has low heat resistance. The content of the plasticizer in the core is preferably not less than 0.05% by weight and not more than 7% by weight, more preferably not less than 0.1% by weight and not more than 7% by weight.

The plasticizer in the core includes a compound that provides flexibility, weather resistance, and processability to resins. Examples of the plasticizer include, but are not limited to, epoxy plasticizers, phthalate plasticizers, polyester plasticizers, paraffin hydrocarbons, and polyethylene oxides.

Specific examples of the plasticizer include, but are not limited to, epoxidized soybean oil (ESBO), epoxidized linseed oil (ELSO), dioctyl adipate (DOA), diisononyl adipate (DINA), tricresyl phosphate (TCP), acetyl tributyl citrate (ATBC), trioctyl trimellitate (TOTM), sebacate, azelate, paraffin wax, light liquid paraffin, heavy liquid paraffin, bis(2-ethylhexyl) phthalate (DEHP), butylbenzyl phthalate (BBP), dibutyl phthalate (DBP), diisobutyl phthalate, diisodecyl phthalate (DIDP), dioctyl phthalate (DOP), polyethylene oxide (PEO), and polyethylene glycol (PEG).

The core may contain an antioxidant and/or stabilizers such as thermal stabilizer, provided that the amount of the agent(s) in the core is not large enough to affect the light transmittance of the core.

The water-absorbing ratio of the core is not less than 0.001% and not more than 0.29%. When the water-absorbing ratio is more than 0.29%, water is readily absorbed by the core, and the core consequently shows change in light transmission over time. The water-absorbing ratio of the core is preferably not less than 0.002% and not more than 0.20%, more preferably not less than 0.003% and not more than 0.1%.

The total light transmittance of the core is not less than 80%. When the total light transmittance is less than 80%, the core provides poor light transmission, which means that less light is allowed to travel through the fiber even when the length of the fiber is short, and the fiber is thus unsuitable for use in sensor applications. The total light transmittance of the core is preferably not less than 85%, more preferably not less than 87%.

The relationship between the refractive index of the core (X) and the refractive index of the first cladding (Y) is expressed by the inequality: X−Y>0.01. When the relationship between the refractive indices satisfies the following inequality: X−Y<0.01, light is not able to be confined in the core.

Preferably, the core has a melt mass flow rate of not less than 1 g/10 min and not more than 200 g/10 min (at a temperature of 230° C. under a load of 3.8 kg). When the melt mass flow rate of the core is within the above range, spinning, a process by which the core is formed, will proceed steadily. A melt mass flow rate of not less than 1 g/10 min and not more than 100 g/10 min (at a temperature of 230° C. under a load of 3.8 kg) is more preferred.

Cladding

The plastic optical fiber includes at least two layers of cladding.

In the plastic optical fiber, the first cladding is preferably made of a polymer of methyl methacrylate and/or of a copolymer mainly composed of methyl methacrylate and containing not less than 0.1% by weight and not more than 12% by weight of at least one copolymerization component, selected from the group consisting of methyl acrylate, ethyl acrylate, and butyl acrylate. A polymer that is mainly composed of methyl methacrylate refers to a polymer in which not less than 50% by mole of the repeating units that make up the polymer are derived from methyl methacrylate. A material having a low refractive index relative to the core and exhibiting excellent interfacial adherence to the core is preferred as a first cladding material. As for the first cladding, a polymer of methyl methacrylate and/or a copolymer mainly composed of methyl methacrylate, as described above, can be selected to increase both the interfacial adherence to the core and the bending resistance.

Examples of copolymerization components of the copolymer mainly composed of methyl methacrylate include (meth)acrylic esters, (meth)acrylic acid, styrene, substituted styrenes, and N-substituted maleimides. The (meth)acrylic esters, substituted styrenes, and N-substituted maleimides are same as the polymerization components described for the core. Any two of the components may be used.

Moreover, the copolymer mainly composed of methyl methacrylate preferably contains not less than 0.1% by weight and not more than 12% by weight of at least one copolymerization component, selected from the group consisting of methyl acrylate, ethyl acrylate, and butyl acrylate. The presence of methyl acrylate, ethyl acrylate, or butyl acrylate as a copolymerization component can provide heat resistance and/or adjust the melt viscosity. The copolymerization component is preferably methyl acrylate. In this example, the interfacial adherence to the core is increased further, which can result in increased breaking strength of the plastic optical fiber. The content of the copolymerization component is more preferably not less than 0.3% by weight and not more than 10% by weight, still more preferably not less than 0.8% by weight and not more than 6% by weight.

Preferably, the plastic optical fiber of the invention satisfies inequality (1):

$$0.01 \leq x \leq 20. \quad (1)$$

In inequality (1), x represents the ratio of the thickness of the first cladding to the fiber diameter expressed as a percentage: x=(thickness of the first cladding)×100/(fiber diameter) (%). On the other hand, when the percentage represented by x is not less than 0.01%, the interfacial adherence is improved between the core and the first cladding and between the first cladding and the second cladding, which results in an increased bending resistance of the plastic optical fiber. As the percentage represented by x, a percentage of not less than 0.05% is more preferred, and a percentage of not less than 0.1% is still more preferred. When the percentage represented by x is not more than 20%, the proportion of the second cladding, which has relatively higher bending resistance, is increased, which results in an increased bending resistance of the plastic optical fiber. As the percentage represented by x, a percentage of not more than 10% is more preferred, and a percentage of not more than 8% is still more preferred.

The thickness of the first cladding and the fiber diameter can be measured as follows. A plastic optical fiber is cut perpendicular to the longitudinal direction at randomly selected five positions, and the surface of each cross section is smoothed so that the interfaces between the core and the first cladding and between the first cladding and the second cladding can be observed. Each of the resulting surfaces is observed using a digital microscope VHX-7000 (manufactured by Keyence Corporation) to magnify the view. The magnification of the observation ranges from 10 times to 200 times, and a magnification that allows the entirety of the cross-sectional surface area to be within the field of view is chosen, at which the interfaces can be observed. For each cross section, the thickness of the thinnest part of the first cladding is measured, and the measured value is recorded as the thickness of the first cladding. The measured diameter of the optical fiber is considered as the fiber diameter. When the cross-sectional shape of the optical fiber is not circular, the shortest diameter measured from the optical fiber is considered as the fiber diameter. The fiber diameter and the thickness of the first cladding are measured in each of the five cross sections, and the means of the measured values are considered as the fiber diameter and the thickness of the first cladding.

The relationship between the refractive index of the first cladding (Y) and the refractive index of the second cladding (Z) is expressed by the inequality: Y−Z>0.05. When the relationship between the refractive indices satisfies the following inequality: Y−Z<0.05, it is easier for light to leak out of the second cladding.

The water-absorbing ratio of the second cladding is preferably not less than 0.001% and not more than 0.29%. When the water-absorbing ratio is within the above range, the absorption of water can be reduced. The water-absorbing ratio is preferably not less than 0.002% and not more than 0.20%, more preferably not less than 0.003% and not more than 0.1%. The bending elastic modulus of the second cladding is preferably not less than 100 MPa and not more than 2,000 MPa. When the bending elastic modulus is not less than 100 MPa, the protective effect of the second cladding on the first cladding is improved, which results in an increased bending resistance of the plastic optical fiber. When the bending elastic modulus is not more than 2,000 MPa, the bending stress on the first cladding is reduced, which results in an increased bending resistance of the plastic optical fiber. The bending elastic modulus is more preferably not more than 1,500 MPa. The bending elastic modulus is measured according to ASTM D790 (2010). A test strip with a size of 127 mm×13 mm×3.1 mm is used for the measurement, and the unit of the measurement is kg/cm$^2$. The bending elastic modulus is calculated from the initial slope of the load-deflection curve of the strip, which is the largest among the slopes of tangent lines to the load-deflection curve. When it is difficult to collect a portion from the cladding for direct measurement of the bending elastic modulus, the bending elastic modulus may be measured in a cladding product having the same composition as the above cladding, provided that the composition of the cladding is known.

As methods to limit the bending elastic modulus of the second cladding within the range as described above, for example, a method using a fluorine-containing polymer as described below and other methods have been described.

The second cladding preferably contains a fluorine-containing polymer. Examples of a polymerization component of the fluorine-containing polymer include vinylidene fluoride, tetrafluoroethylene, hexafluoropropylene, perfluoroalkyl vinyl ether, hexafluoroacetone, perfluoroalkyl methacrylate, hexafluoropropyl methacrylate, tetrafluoropropyl methacrylate, and pentafluoropropyl methacrylate. Any two of the components may be used. The percentage of fluorine contained in the second cladding is preferably not less than 50% by weight. With the fluorine content limited to not less than 50% by weight, the proportion of monomer residues with a low fluorine content, such as acrylates or methacrylates, is reduced in the second cladding, which allows easy adjustment of the bending elastic modulus within the aforementioned preferable range and provides higher bending resistance.

Preferably, ethylene is further used as a polymerization component of the fluorine-containing polymer for the second cladding. Copolymerization with ethylene can improve the moldability and additionally increase the breaking strength of the plastic optical fiber.

Preferably, the second cladding contains not less than 0.03% by weight and not more than 5.0% by weight of carbon black. When the content of carbon black is not less than 0.03% by weight, the second cladding can block out the external light, which provides a sensor with higher sensitivity. The content of carbon black is more preferably not less than 0.05% by weight, still more preferably not less than 0.1% by weight. When the content of carbon black is less than 5.0% by weight, the processability of the second cladding is improved. The content of carbon black is more preferably less than 3.0% by weight, still more preferably less than 1.0% by weight.

The second cladding may contain a pigment such as titanium dioxide, zinc oxide, or chromium oxide and other additives, in addition to the carbon black, to the extent that the properties of the second cladding are not impaired.

In addition, the copolymer for the second cladding preferably has a carbonyl-containing functional group on the polymer chain ends or side chains. The presence of a carbonyl-containing functional group can increase the solvent resistance.

Examples of the carbonyl-containing functional group include carbonate group with formula —OC(=O)O—, and carboxylic acid halide group with formula —COY, where Y represents a halogen atom. Fluorine-containing variants of these groups are still more preferred. Among those, fluorine-containing carbonate groups (—RF—O—C(=O)—RF'—) and carboxylic acid fluoride group (—C(=O)F) are preferred, where RF and RF' represent fluorine-containing groups, such as alkyl fluoride groups and vinylidene fluoride group.

Preferably, the plastic optical fiber of the invention satisfies inequality (2):

$$0.5 \leq y. \tag{2}$$

In inequality (2), y represents the ratio of the thickness of the second cladding to the fiber diameter expressed as a percentage: y=(thickness of the second cladding)×100/(fiber diameter) (%). When the percentage represented by y is within the aforementioned preferable range, the proportion of the second cladding in the plastic optical fiber can be maintained high, which prevents reduction of bending resistance. The percentage represented by y is more preferably not less than 1%, still more preferably not less than 5%.

The thickness of the second cladding and the fiber diameter can be measured in the same manner as described for the thickness and fiber diameter of the first cladding.

The value R (dB/km) of optical transmission loss measured at a wavelength of 660 nm and the value I (dB/km) of optical transmission loss measured at a wavelength of 800 nm preferably satisfy the inequality: R<I. Those values still more preferably satisfy the inequality: 0.2<R/I<1. Light with a wavelength of 660 nm or 800 nm generally passes through the body, and the values of optical transmission loss measured at the wavelengths are therefore used as indicators for sensor sensitivity. In particular, the reflection of light with a wavelength of 660 nm varies significantly depending on the oxygen content of hemoglobin, but the reflection of light with a wavelength of 800 nm is rarely affected by the oxygen content. These characteristics of the wavelengths are utilized, and a value calculated by dividing R by I, R/I, is widely used as an indicator for sensor sensitivity. When the ratio is larger than 0.2, the plastic optical fiber efficiently transmits light with a wavelength of 660 nm and increases the sensor sensitivity. Moreover, when the ratio is less than 1, the plastic optical fiber efficiently transmits light with a wavelength of 800 nm and keeps the sensor sensitivity at a constant level.

The plastic optical fiber preferably has a fiber diameter of not less than 100 μm and not more than 500 μm. A fiber diameter of not less than 100 μm allows the plastic optical fiber to provide the light intensity required for illumination. On the other hand, a fiber diameter of not more than 500 μm allows the plastic optical fiber to attain higher bending resistance.

As a method of producing the plastic optical fiber, a conjugate fiber spinning method is preferably used, in which molten materials for the core and the claddings under heating are extruded from a conjugate spinneret for coaxial fiber spinning to form a core-sheath structure consisting of three layers, which correspond to the core, the first cladding, and the second cladding. In general, the fiber is subsequently stretched up to a draw ratio of around 1.2 to 3 times to improve mechanical properties such as breaking strength and thereby to produce a plastic optical fiber.

A lower spinning temperature is more preferred, and the spinning temperature is preferably not higher than 250° C., still more preferably not higher than 240° C.

A plastic optical fiber cord according to an example comprises at least one coating layer in an outer layer over the aforementioned plastic optical fiber. Examples of a material that makes up the coating layer include polyethylene or polypropylene, or copolymers or blends thereof; organic silane group-containing olefin polymers, ethylene-vinyl acetate, polyvinyl chloride, polyvinylidene fluoride, polyamide resins such as nylon-12; polyester resins, nylon elastomers, polyester elastomers, urethane resins, fluoroplastics, and rubbers, such as EPM and EPDM. The coating layer may be single or multiple and, when the coating layer is composed of multiple layers, a tension member made of "Kevlar (registered trademark)" or the like may be inserted between the coating layers. These coating layers may contain stabilizing agents, such as antioxidant, age-resistor, and UV stabilizer, in addition to a flame retardant. These coating layers can be formed by a known method, such as melt extrusion molding, using a crosshead die.

An endoscopic illumination device includes the above plastic optical fiber and can be used in combination with an endoscope. An ophthalmic surgical illumination probe has the above plastic optical fiber for use for ophthalmic surgical illumination light. A vessel catheter has the above plastic optical fiber that works as an illuminating element of the catheter or as an optical sensor element.

EXAMPLES

Our fibers, devices and cords will be described below in more details by examples. The following methods were used for evaluations in Examples and Comparative Examples.

Water-Absorbing Ratio of Core: The water-absorbing ratios of cores used in this study were as published by each supplier. When the value published by a supplier was unknown, the water-absorbing ratio of a core was determined in accordance with JIS K 7209 on a sample produced based on the information obtained by analyzing the composition of the core.

Composition Ratio of Core: The content of styrene residues in a polymer was determined for each core material used in Examples and Comparative Examples by using a CG/MS (GC: 7890A, manufactured by Agilent; MS: JMS-Q1050GC, manufactured by JEOL Ltd.).

Composition Ratio of Cladding: The Composition ratio (% by weight) was determined for each cladding material used in Examples and Comparative Examples by means of solid $^{19}$F-NMR (AVANCE NEO 400 manufactured by Bruker Corporation) and FT-IR (FT-IR manufactured by Bio-Rad Digilab).

Bending elastic modulus of Cladding: The bending elastic modulus of each cladding was measured according to ASTM D790 (2010).

A test strip with a size of 127 mm×13 mm×3.1 mm was produced from each second cladding material used in Examples and Comparative Examples, and the unit of the measurement was kg/cm². The bending elastic modulus was calculated from the initial slope of the load-deflection curve of the strip, which is the largest among the slopes of tangent lines to the load-deflection curve.

Light Intensity Loss in Plastic Optical Fiber Under Water Immersion Condition (Humidity Resistance): The intensity of light emitted from each plastic optical fiber obtained in Examples and Comparative Examples was measured using an 820 nm-LED (light emitting diode). In addition, each plastic optical fiber obtained in Examples and Comparative Examples was immersed in water at 23° C. for 10 minutes, and the intensity of light was similarly measured 100 hours later. The reduction in light intensity obtained by subtracting the initial light intensity from the light intensity measured under the water-immersion conditions (light intensity loss) was used as an index of humidity resistance. A minus value of light intensity loss indicates that the light intensity under water immersion conditions was decreased compared to the initial light intensity. A smaller absolute value of light intensity loss means more excellent humidity resistance.

Bending Times up to Breaking of Plastic Optical Fiber (Durability): Each plastic optical fiber obtained in Examples and Comparative Examples was supported by mandrels with a diameter of 10 mm, with applying a load of 175 g to one end, and was repeatedly bent without interruption by turning the other end 180 degrees around the supported point to count the number of bending cycles required to cut the plastic optical fiber (average value of n measurements, n=5). A larger number of bending cycles means more excellent durability.

Light Intensity Loss in Plastic Optical Fiber Under Bending Condition (Bending Resistance): The intensity of light emitted from each plastic optical fiber obtained in Examples and Comparative Examples was measured using an 820 nm-LED (light emitting diode). In addition, each plastic optical fiber obtained in Examples and Comparative Examples was wrapped 360 degrees around a metal cylinder with a radius of 5 mm, and the intensity of light was similarly measured. The reduction in light intensity obtained by subtracting the initial light intensity from the light intensity measured under the bending conditions (light intensity loss) was used as an index of bending resistance. A minus value of light intensity loss indicates that the light intensity under bending conditions was decreased compared to the initial light intensity. A smaller absolute value of light intensity loss means more excellent bending resistance.

Breaking Strength of Plastic Optical Fiber: Each plastic optical fiber obtained in Examples and Comparative Examples was tested at a stretching speed of 100 mm/min in a tensile test according to JIS C 6837 (2015) to measure the strength of tension at which the plastic optical fiber was broken (breaking strength). Three samples from each plastic optical fiber were measured, and the average value of the measurements was used.

Optical Transmission Loss in Plastic Optical Fiber: Light with a wavelength of 660 nm and light with a wavelength of 800 nm from a halogen lamp light source were selected and used to determine the optical transmission loss (dB/km) of each plastic optical fiber obtained in Examples and Comparative Examples, and the optical transmission loss was measured by cutting-back the plastic optical fiber from 5 m to 2 m.

Example 1

As materials for the first and second claddings, a methyl methacrylate/methyl acrylate copolymer, in which the components were mixed in a ratio shown in Table 1, and a vinylidene fluoride polymer were respectively fed into a conjugate spinner. In addition, a core material consisting of 95% by weight of a polystyrene, which was produced by continuous bulk polymerization and in which the content of styrene residues was 100% by mole, and 5% by weight of liquid paraffin were fed into the conjugate spinner. A core and claddings were prepared by core-sheath conjugate melt spinning at 220° C. to produce a plastic optical fiber with a fiber diameter of 300 μm (the diameter of the core: 228 μm, the thickness of the first cladding: 6 μm, the thickness of the second cladding: 30 μm).

The thus obtained plastic optical fiber was evaluated by the above-described methods, and the results of the evaluations are presented in Table 2.

Example 2

A plastic optical fiber was obtained in the same manner as described in Example 1, except that the cladding material for the first cladding was changed to a polymer with the composition indicated in Table 1. The obtained plastic optical fiber was evaluated in the same manner as described in Example 1, and the results of the evaluations are presented in Table 2.

Example 3

A plastic optical fiber was obtained in the same manner as described in Example 1, except that the thickness of the second cladding was changed to produce the value of y indicated in Table 1. The obtained plastic optical fiber was evaluated in the same manner as described in Example 1, and the results of the evaluations are presented in Table 2.

Example 4

A plastic optical fiber was obtained in the same manner as described in Example 1, except that the cladding material for the second cladding was changed to a copolymer with the composition ratio indicated in Table 1. The obtained plastic optical fiber was evaluated in the same manner as described in Example 1, and the results of the evaluations are presented in Table 2.

Example 5

A plastic optical fiber was obtained in the same manner as described in Example 1, except that the ratio between polystyrene and liquid paraffin in the core material was changed as indicated in Table 1. The obtained plastic optical fiber was evaluated in the same manner as described in Example 1, and the results of the evaluations are presented in Table 2.

Example 6

A plastic optical fiber was obtained in the same manner as described in Example 1, except that the cladding material for the second cladding was changed to a copolymer with the composition ratio indicated in Table 1. The obtained plastic optical fiber was evaluated in the same manner as described in Example 1, and the results of the evaluations are presented in Table 2.

Examples 7 to 9

Plastic optical fibers were obtained in the same manner as described in Example 1, except that the cladding material for each first cladding was changed to a polymer with each composition indicated in Table 1. The obtained plastic optical fibers were evaluated in the same manner as described in Example 1, and the results of the evaluations are presented in Table 2.

Example 10

A plastic optical fiber was obtained in the same manner as described in Example 7, except that liquid paraffin was not used as a material for the core. The obtained plastic optical fiber was evaluated in the same manner as described in Example 1, and the results of the evaluations are presented in Table 2.

Examples 11 and 12

Plastic optical fibers were obtained in the same manner as described in Example 1, except that the cladding material for the first cladding was changed to each polymer indicated in Table 1. The obtained plastic optical fibers were evaluated in the same manner as described in Example 1, and the results of the evaluations are presented in Table 2.

Examples 13 and 14

Plastic optical fibers were obtained in the same manner as described in Example 1, except that the thicknesses of each first cladding and each second cladding were changed as indicated in Table 1. The obtained plastic optical fibers were evaluated in the same manner as described in Example 1, and the results of the evaluations are presented in Table 2.

Examples 15 to 17

Plastic optical fibers were obtained in the same manner as described in Example 1, except that either liquid paraffin or PEO was used in the core material and carbon black was used in the second cladding. The obtained plastic optical fibers were evaluated in the same manner as described in Example 1, and the results of the evaluations are presented in Table 2.

Examples 18 to 20

Plastic optical fibers were obtained in the same manner as described in Example 1, except that each core material was chanted as indicated in Table 1. The obtained plastic optical fibers were evaluated in the same manner as described in Example 1, and the results of the evaluations are presented in Table 2.

Example 21

A plastic optical fiber was obtained in the same manner as described in Example 10, except that the spinning process was performed on the core material at a temperature of 250° C. The obtained plastic optical fiber was evaluated in the same manner as described in Example 1, and the results of the evaluations are presented in Table 2.

Comparative Examples 1 to 4

Plastic optical fibers were obtained in the same manner as described in Example 1, except that the core and cladding materials were changed to copolymers with each composition ratio indicated in Table 3. The plastic optical fibers were evaluated in the same manner as described in Example 1, and the results of the evaluations are presented in Table 4.

Comparative Examples 5 and 6

Plastic optical fibers were obtained in the same manner as described in Example 1, except that the thicknesses of the claddings were changed to produce the values of x and y indicated in Table 3. The plastic optical fibers were evaluated in the same manner as described in Example 1, and the results of the evaluations are presented in Table 4.

Comparative Examples 7 and 8

Plastic optical fibers were obtained in the same manner as described in Example 1, except that the cladding structure was changed to a single-layer cladding structure. The plastic optical fibers were evaluated in the same manner as described in Example 1, and the results of the evaluations are presented in Table 4.

Comparative Example 9

A plastic optical fiber was obtained in the same manner as described in Example 1, except that the core and the claddings were changed to copolymers with each composition ratio indicated in Table 3. The obtained plastic optical fiber was evaluated in the same manner as described in Example 1, and the results of the evaluations are presented in Table 4.

TABLE 1

| | | Core | | | | First Cladding | | |
|---|---|---|---|---|---|---|---|---|
| | Fiber Diameter (μm) | Composition Ratio (Wt %) | Water-absorbing Ratio (%) | Total Light Transmittance (%) | Reflective Index | Composition Rate (Wt %) | Reflective Index | x (%) |
| Example 1 | 300 | St/LP = 95/5 | 0.04 | 90 | 1.59 | MMA/MA = 98/2 | 1.49 | 2 |
| Example 2 | 300 | St/LP = 95/5 | 0.04 | 90 | 1.59 | MMA = 100 | 1.49 | 2 |
| Example 3 | 300 | St/LP = 95/5 | 0.04 | 90 | 1.59 | MMA = 100 | 1.49 | 2 |
| Example 4 | 300 | St/LP = 95/5 | 0.04 | 90 | 1.59 | MMA = 100 | 1.49 | 2 |
| Example 5 | 300 | St/LP = 98/2 | 0.06 | 90 | 1.59 | MMA = 100 | 1.49 | 2 |
| Example 6 | 300 | St/LP = 95/5 | 0.04 | 90 | 1.59 | MMA/MA = 98/2 | 1.49 | 2 |
| Example 7 | 300 | St/LP = 95/5 | 0.04 | 90 | 1.59 | MMA/MA = 96/4 | 1.49 | 2 |
| Example 8 | 300 | St/LP = 95/5 | 0.04 | 90 | 1.59 | MMA/MA = 93/7 | 1.49 | 2 |
| Example 9 | 300 | St/LP = 95/5 | 0.04 | 90 | 1.59 | MMA/MA = 90/10 | 1.49 | 2 |
| Example 10 | 300 | St = 100 | 0.08 | 91 | 1.59 | MMA/MA = 96/4 | 1.49 | 2 |
| Example 11 | 300 | St/LP = 95/5 | 0.04 | 90 | 1.59 | MMA/EA = 98/2 | 1.49 | 2 |
| Example 12 | 300 | St/LP = 95/5 | 0.04 | 90 | 1.59 | MMA/BA = 98/2 | 1.49 | 2 |
| Example 13 | 300 | St/LP = 95/5 | 0.04 | 90 | 1.59 | MMA/MA = 98/2 | 1.49 | 10 |
| Example 14 | 300 | St/LP = 95/5 | 0.04 | 90 | 1.59 | MMA/MA = 98/2 | 1.49 | 18 |
| Example 15 | 300 | St/PEO = 99/1 | 0.05 | 90 | 1.59 | MMA/MA = 96/2 | 1.49 | 4 |
| Example 16 | 300 | St/LP = 98/2 | 0.05 | 90 | 1.59 | MMA/MA = 96/2 | 1.49 | 4 |
| Example 17 | 300 | St/LP = 98/2 | 0.05 | 90 | 1.59 | MMA/MA = 96/2 | 1.49 | 4 |
| Example 18 | 300 | TPX = 100 | 0.004 | 92 | 1.46 | MMA/MA = 96/4 | 1.49 | 2 |
| Example 19 | 300 | PC = 100 | 0.20 | 91 | 1.59 | MMA/MA = 96/4 | 1.49 | 2 |
| Example 20 | 300 | COP = 100 | 0.008 | 91 | 1.53 | MMA/MA = 96/4 | 1.49 | 2 |
| Example 21 | 300 | St = 100 | 0.08 | 91 | 1.59 | MMA/MA = 96/4 | 1.49 | 2 |

| | Second Cladding | | | | | | | Difference between Reflective Indexes | |
|---|---|---|---|---|---|---|---|---|---|
| | Composition Ratio (Wt %) | Fluorine Content (Wt %) | Water-absorbing Ratio (%) | Reflective Index | Carbon Black Content (wt %) | y (%) | Flexural Modulus (MPa) | X − Y | Y − Z |
| Example 1 | 2F = 100 | 59 | 0.04 | 1.42 | 0 | 10 | 790 | 0.10 | 0.07 |
| Example 2 | 2F = 100 | 59 | 0.04 | 1.42 | 0 | 10 | 790 | 0.10 | 0.07 |
| Example 3 | 2F = 100 | 59 | 0.04 | 1.42 | 0 | 13 | 790 | 0.10 | 0.07 |
| Example 4 | 2F/4F = 75/25 | 64 | 0.02 | 1.40 | 0 | 10 | 750 | 0.10 | 0.09 |
| Example 5 | 2F/4F = 75/25 | 64 | 0.02 | 1.40 | 0 | 10 | 750 | 0.10 | 0.09 |
| Example 6 | Ethylene/4F/6F = 20/55/25 | 61 | 0.03 | 1.38 | 0 | 10 | 1,250 | 0.10 | 0.11 |
| Example 7 | Ethylene/4F/6F = 20/55/25 | 61 | 0.03 | 1.38 | 0 | 10 | 1,250 | 0.10 | 0.11 |
| Example 8 | Ethylene/4F/6F = 20/55/25 | 61 | 0.03 | 1.38 | 0 | 10 | 1,250 | 0.10 | 0.11 |
| Example 9 | Ethylene/4F/6F = 20/55/25 | 61 | 0.03 | 1.38 | 0 | 10 | 1,250 | 0.10 | 0.11 |
| Example 10 | Ethylene/4F/6F = 20/55/25 | 61 | 0.03 | 1.38 | 0 | 10 | 1,250 | 0.10 | 0.11 |
| Example 11 | Ethylene/4F/6F = 20/55/25 | 61 | 0.03 | 1.38 | 0 | 10 | 1,250 | 0.10 | 0.11 |
| Example 12 | Ethylene/4F/6F = 20/55/25 | 61 | 0.03 | 1.38 | 0 | 10 | 1,250 | 0.10 | 0.11 |
| Example 13 | 2F = 100 | 59 | 0.04 | 1.42 | 0 | 5 | 790 | 0.10 | 0.07 |
| Example 14 | 2F = 100 | 59 | 0.04 | 1.42 | 0 | 7 | 790 | 0.10 | 0.07 |
| Example 15 | 2F/6F = 90/10 | 61 | 0.03 | 1.38 | 0.4 | 7 | 200 | 0.10 | 0.11 |
| Example 16 | 2F/6F = 90/10 | 61 | 0.03 | 1.38 | 0.7 | 7 | 200 | 0.10 | 0.11 |
| Example 17 | 2F/6F = 90/10 | 61 | 0.03 | 1.38 | 4 | 7 | 200 | 0.10 | 0.11 |
| Example 18 | Ethylene/4F/6F = 20/55/25 | 61 | 0.03 | 1.38 | 0 | 10 | 1250 | −0.03 | 0.11 |
| Example 19 | Ethylene/4F/6F = 20/55/25 | 61 | 0.03 | 1.38 | 0 | 10 | 1250 | 0.10 | 0.11 |
| Example 20 | Ethylene/4F/6F = 20/55/25 | 61 | 0.03 | 1.38 | 0 | 10 | 1250 | 0.04 | 0.11 |
| Example 21 | Ethylene/4F/6F = 20/55/25 | 61 | 0.03 | 1.38 | 0 | 10 | 1250 | 0.10 | 0.11 |

The meanings of the abbreviations in Table 1 are shown below. The abbreviations in Table 3 have the same meanings.

LP: liquid paraffin, St: polystyrene, PEO: polyethylene oxide, TPX: polymethylpentene, PC: polycarbonate, PC: polycarbonate, COP: polycycloolefin, MMA: methyl methacrylate, MA: methyl acrylate, 2F: vinylidene fluoride, 4F: tetrafluoroethylene, 6F: hexafluoropropylene, FVE: heptafluorovinyl ether, 4FM: tetrafluoropropyl methacrylate, 5FM: pentafluoropropyl methacrylate.

TABLE 2

| | Moisture Resistance Light Intensity Loss under Water Immersion Condition (dB) | Bending Resistance | | Breaking Strength (N) | R (dB/km) | I (dB/km) | R/I |
|---|---|---|---|---|---|---|---|
| | | Bending Times up to Breaking (Times) | Light Intensity Loss under Bending Condition (dB) | | | | |
| Example 1 | −0.01 | 43000 | −0.39 | 4.5 | 610 | 1220 | 0.50 |
| Example 2 | −0.02 | 41000 | −0.43 | 4.4 | 640 | 1190 | 0.54 |
| Example 3 | −0.01 | 46000 | −0.55 | 4.5 | 630 | 1200 | 0.53 |
| Example 4 | −0.01 | 43000 | −0.43 | 4.5 | 630 | 1180 | 0.53 |
| Example 5 | −0.01 | 42000 | −0.33 | 4.5 | 700 | 1240 | 0.56 |
| Example 6 | −0.01 | 45000 | −0.27 | 4.7 | 630 | 1150 | 0.55 |
| Example 7 | −0.01 | 45000 | −0.27 | 4.8 | 600 | 1100 | 0.55 |
| Example 8 | −0.01 | 45000 | −0.28 | 4.9 | 610 | 1140 | 0.54 |
| Example 9 | −0.01 | 45000 | −0.28 | 5.0 | 600 | 1160 | 0.52 |
| Example 10 | −0.02 | 45000 | −0.29 | 5.1 | 780 | 1280 | 0.61 |
| Example 11 | −0.01 | 40000 | −0.40 | 4.3 | 620 | 1200 | 0.52 |
| Example 12 | −0.01 | 39000 | −0.43 | 4.0 | 630 | 1210 | 0.52 |
| Example 13 | −0.01 | 48000 | −0.41 | 4.6 | 630 | 1200 | 0.53 |
| Example 14 | −0.01 | 51000 | −0.40 | 4.6 | 640 | 1240 | 0.52 |
| Example 15 | −0.01 | 44000 | −0.39 | 4.4 | 630 | 1250 | 0.50 |
| Example 16 | −0.01 | 49000 | −0.50 | 4.8 | 790 | 1380 | 0.57 |
| Example 17 | −0.01 | 50000 | −0.52 | 4.9 | 820 | 1390 | 0.59 |
| Example 18 | −0.01 | 42000 | −0.35 | 4.2 | 1090 | 3300 | 0.33 |
| Example 19 | −0.04 | 41000 | −0.44 | 4.7 | 1200 | 2500 | 0.48 |
| Example 20 | −0.01 | 41000 | −0.35 | 4.6 | 1120 | 4000 | 0.28 |
| Example 21 | −0.02 | 45000 | −0.29 | 5.1 | 1450 | 1280 | 1.13 |

TABLE 3

| | Core | | | | | First Cladding | | |
|---|---|---|---|---|---|---|---|---|
| | Fiber Diameter (μm) | Composition Ratio (Wt %) | Water-absorbing Ratio (%) | Total Light Transmittance (%) | Reflactive Index | Composition Ratio (Wt %) | Reflactive Index | x (%) |
| Comparative Example 1 | 300 | MMA = 100 | 0.31 | 94 | 1.49 | 2F/4F/6F/FVE = 23/53/17/7 | 1.36 | 2 |
| Comparative Example 2 | 300 | St/LP = 95/5 | 0.04 | 90 | 1.59 | 2F | 1.42 | 2 |
| Comparative Example 3 | 300 | St/LP = 95/5 | 0.04 | 90 | 1.59 | MMA = 100 | 1.49 | 2 |
| Comparative Example 4 | 300 | St/LP = 95/5 | 0.04 | 90 | 1.59 | MMA = 100 | 1.49 | 2 |
| Comparative Example 5 | 300 | St/LP = 95/5 | 0.04 | 90 | 1.59 | MMA = 100 | 1.49 | 10 |
| Comparative Example 6 | 300 | St/LP = 95/5 | 0.04 | 90 | 1.59 | MMA = 100 | 1.49 | 2 |
| Comparative Example 7 | 300 | St/LP = 95/5 | 0.04 | 90 | 1.59 | 2F | 1.42 | 10 |
| Comparative Example 8 | 300 | St/LP = 95/5 | 0.04 | 90 | 1.59 | MMA = 100 | 1.49 | 10 |
| Comparative Example 9 | 300 | St = 100 | 0.08 | 91 | 1.59 | 2F | 1.42 | 2 |

| | Second Cladding | | | | | | Difference between Reflactive Indexes | |
|---|---|---|---|---|---|---|---|---|
| | Composition Ratio (Wt %) | Fluorine Content (Wt %) | Water-absorbing Ratio (%) | Reflactive Index | Carbon Black Content (wt %) | y (%) | Flexural Modulus (MPa) | X − Y | Y − Z |
| Comparative Example 1 | 2F = 100 | 59 | 0.04 | 1.42 | 0 | 10 | 790 | 0.13 | (0.06) |
| Comparative Example 2 | 2F/4F = 75/25 | 64 | 0.02 | 1.40 | 0 | 10 | 750 | 0.17 | 0.02 |
| Comparative Example 3 | MMA/4FM/5FM = 19/19/62 | 34 | 0.10 | 1.42 | 0 | 10 | 2490 | 0.10 | 0.07 |

TABLE 3-continued

| | | | | | | | | | |
|---|---|---|---|---|---|---|---|---|---|
| Comparative Example 4 | 2F/4F/6F/FVE = 19/61/16/4 | 73 | 0.004 | 1.36 | 0 | 10 | 80 | 0.10 | 0.13 |
| Comparative Example 5 | 2F = 100 | 59 | 0.04 | 1.42 | 0 | 10 | 790 | 0.10 | 0.07 |
| Comparative Example 6 | 2F = 100 | 59 | 0.04 | 1.42 | 0 | 2 | 790 | 0.10 | 0.07 |
| Comparative Example 7 | — | — | — | — | — | 0 | — | 0.17 | — |
| Comparative Example 8 | — | — | — | — | — | 0 | — | 0.10 | — |
| Comparative Example 9 | 2F/4F = 75/25 | 64 | 0.02 | 1.40 | 0 | 10 | 750 | 0.17 | 0.02 |

TABLE 4

| | Moisture Resistance Light Intensity Loss under Water Immersion Condition (dB) | Bending Resistance | | Breaking Strength (N) | R (dB/km) | I (dB/km) | R/I |
|---|---|---|---|---|---|---|---|
| | | Bending Times up to Breaking (Times) | Light Intensity Loss under Bending Condition (dB) | | | | |
| Comparative Example 1 | −0.10 | 42000 | −0.33 | 4.4 | 190 | 2200 | 0.09 |
| Comparative Example 2 | −0.02 | 35000 | −1.95 | 4.1 | 3300 | 4500 | 0.73 |
| Comparative Example 3 | −0.02 | 8600 | −0.76 | 4.2 | 1200 | 1400 | 0.86 |
| Comparative Example 4 | impossible to wind | impossible to wind | impossible to wind | impossible to wind | — | — | — |
| Comparative Example 5 | −0.01 | 22000 | −0.61 | 4.3 | 1100 | 1390 | 0.79 |
| Comparative Example 6 | −0.03 | 14000 | −0.41 | 4.1 | 1360 | 1460 | 0.93 |
| Comparative Example 7 | −0.02 | 32000 | −1.51 | 4.1 | 4200 | 5600 | 0.75 |
| Comparative Example 8 | −0.02 | 2500 | −0.41 | 4.2 | 1300 | 1460 | 0.89 |
| Comparative Example 9 | −0.02 | 16000 | −0.55 | 4.0 | 3700 | 3660 | 1.01 |

INDUSTRIAL APPLICABILITY

The plastic optical fiber and plastic optical fiber cord can be suitable for use in applications including wiring in moving bodies, such as automobiles, airplanes, ships, and electric railcars; short-range communication wiring in audio-visual equipment, home appliances, office equipment, and the like; medical endoscopic illumination, ophthalmic surgical illumination, laparoscopic surgical illumination, catheter illumination, microscope illumination, light-guide sensors for robots, photoelectric sensors for industrial machines, automobile sensors for anticollision systems, illumination for wall surface decoration, interior illumination, and the like. Specifically, the plastic optical fiber and the plastic optical fiber cord have features such as high aperture ratio, moderate flexibility, and resistance to bending, which causes transmission loss, and are therefore suitable for medical device illumination and industrial sensors, more specifically suitable for endoscopic illumination, ophthalmic surgery, and catheter applications.

The invention claimed is:

1. A plastic optical fiber having a multilayer structure that comprises
a core (X),
a first cladding (Y), and
a second cladding (Z),
wherein the core is made of an organic polymer material having
  a water-absorbing ratio of not less than 0.001% and not more than 0.29% and
  a total light transmittance of not less than 80% and
  containing not less than 0.01% by weight and not more than 10% by weight of a plasticizer;
a relationship between a refractive index of the core (X) and a refractive index of the first cladding (Y) is defined by inequality: X−Y>0.01, and
a relationship between the refractive index of the first cladding (Y) and a refractive index of the second cladding (Z) is defined by inequality: Y−Z>0.05,
wherein the plastic optical fiber satisfies inequalities (1) and (2):

$$2 \leq x \leq 18, \tag{1}$$

wherein x is represented by formula: (thickness of the first cladding)×100/(diameter of the fiber) (%); and $$5 \le y, \quad (2)$$

wherein y is represented by formula: (thickness of the second cladding)×100/(diameter of the fiber) (%).

2. The plastic optical fiber according to claim 1, wherein the core (X) is made of a polymer mainly composed of any of styrene, cycloolefin, and methyl pentene.

3. The plastic optical fiber according to claim 1, wherein the first cladding (Y) is made of a polymer of methyl methacrylate and/or of a copolymer mainly composed of methyl methacrylate and containing not less than 0.1% by weight and not more than 12% by weight of at least one copolymerization component, selected from the group consisting of methyl acrylate, ethyl acrylate, and butyl acrylate.

4. The plastic optical fiber according to claim 1, wherein the second cladding (Z) has a water-absorbing ratio of not less than 0.001% and not more than 0.29% and an elastic modulus of not less than 100 MPa and not more than 2,000 MPa.

5. The plastic optical fiber according to claim 1, wherein the second cladding (Z) contains not less than 0.03% by weight and not more than 5.0% by weight of carbon black.

6. The plastic optical fiber according to claim 1, wherein a value R (dB/km) of optical transmission loss measured at a wavelength of 660 nm and a value I (dB/km) of optical transmission loss measured at a wavelength of 800 nm satisfy inequality: R<I.

7. The plastic optical fiber according to claim 1, wherein a value R (dB/km) of optical transmission loss measured at a wavelength of 660 nm and a value I (dB/km) of optical transmission loss measured at a wavelength of 800 nm satisfy inequality: 0.2<R/I<1.

8. The plastic optical fiber according to claim 1, wherein the core (X) has a melt mass flow rate of not less than 1 g/10 min and not more than 200 g/10 min (at a temperature of 230° C. under a load of 3.8 kg).

9. The plastic optical fiber according to claim 1, wherein a diameter of the fiber is not less than 100 μm and not more than 500 μm.

10. A medical lighting device comprising the plastic optical fiber according to claim 1.

11. A medical sensor device comprising the plastic optical fiber according to claim 1.

12. A medical phototherapy device comprising the plastic optical fiber according to claim 1.

13. A plastic optical fiber cord comprising at least one coating layer in an outer layer over the plastic optical fiber according to claim 1.

* * * * *